(12) United States Patent
Huynh et al.

(10) Patent No.: US 7,969,753 B2
(45) Date of Patent: Jun. 28, 2011

(54) MAINTAINING A CONSTANT OUTPUT VOLTAGE BY SAMPLING AND HOLDING A VOLTAGE ACROSS AN AUXILIARY WINDING

(75) Inventors: Steven Huynh, Santa Clara, CA (US); Mingliang Chen, Seterrett, AL (US); Chuan Xiao, ShangHai (CN); Mingfan Yu, Shanghai (CN)

(73) Assignee: Active-Semi, Inc. (VG)

( * ) Notice: Subject to any disclaimer, the term of this patent is extended or adjusted under 35 U.S.C. 154(b) by 335 days.

(21) Appl. No.: 12/288,927

(22) Filed: Oct. 24, 2008

(65) Prior Publication Data

US 2009/0058387 A1    Mar. 5, 2009

Related U.S. Application Data

(63) Continuation of application No. 12/001,173, filed on Dec. 10, 2007, now Pat. No. 7,635,956, which is a continuation of application No. 11/326,828, filed on Jan. 6, 2006, now Pat. No. 7,307,390.

(51) Int. Cl.
   *H02M 3/335* (2006.01)
(52) U.S. Cl. ............... 363/21.01; 363/21.16; 363/21.18
(58) Field of Classification Search ............. 363/21.01, 363/21.12, 21.15, 21.16, 21.18
   See application file for complete search history.

(56) References Cited

U.S. PATENT DOCUMENTS

| | | | |
|---|---|---|---|
| 4,301,497 A | 11/1981 | Johari | 363/21 |
| 4,849,869 A | 7/1989 | Tanuma et al. | 363/21 |
| 5,436,550 A | 7/1995 | Arakawa | 323/222 |
| 5,754,414 A | 5/1998 | Hanington | 363/21 |
| 5,841,643 A | 11/1998 | Schenkel | 363/21 |
| 6,229,366 B1 | 5/2001 | Balakrishnan et al. | 327/172 |
| 6,239,558 B1 | 5/2001 | Fujimura et al. | 315/307 |
| 6,304,461 B1 | 10/2001 | Walker | 363/17 |
| 6,507,501 B2 | 1/2003 | Riggio et al. | 363/16 |
| 6,696,882 B1 | 2/2004 | Markowski et al. | 327/531 |
| 6,721,192 B1 | 4/2004 | Yang et al. | 363/21.18 |
| 6,809,678 B2 | 10/2004 | Vera et al. | 341/166 |
| 6,836,415 B1 * | 12/2004 | Yang et al. | 363/21.01 |
| 6,862,194 B2 * | 3/2005 | Yang et al. | 363/16 |
| 6,864,644 B2 | 3/2005 | Kernahan | 315/307 |
| 6,882,552 B2 * | 4/2005 | Telefus et al. | 363/97 |
| 6,944,034 B1 | 9/2005 | Shteynberg et al. | 363/21.13 |
| 6,958,920 B2 | 10/2005 | Mednik et al. | 363/19 |
| 6,967,472 B2 | 11/2005 | Balakrishnan et al. | 323/284 |
| 6,977,824 B1 * | 12/2005 | Yang et al. | 363/21.16 |
| 7,016,204 B2 * | 3/2006 | Yang et al. | 363/21.13 |
| 7,019,506 B2 | 3/2006 | Kernahan | 323/284 |
| 7,027,313 B2 * | 4/2006 | Amei | 363/21.12 |
| 7,054,170 B2 * | 5/2006 | Yang et al. | 363/21.18 |
| 7,061,225 B2 * | 6/2006 | Yang et al. | 324/103 P |
| 7,061,780 B2 | 6/2006 | Yang et al. | 363/21.16 |
| 7,088,598 B2 | 8/2006 | Yang et al. | 363/21.01 |
| 7,239,533 B2 | 7/2007 | Fukumoto et al. | 363/21.17 |

(Continued)

*Primary Examiner* — Thuy Vinh Tran
(74) *Attorney, Agent, or Firm* — Imperium Patent Works; Glen B. Choi; Darien K. Wallace

(57) ABSTRACT

A lower-cost and more precise control methodology of regulating the output voltage of a flyback converter from the primary side is provided, which works accurately in either continuous voltage mode (CCM) and discontinuous mode (DCM), and can be applied to most small, medium and high power applications such cell phone chargers, power management in desktop computers and networking equipment, and, generally, to a wide spectrum of power management applications. Two highly integrated semiconductor chips based on this control methodology are also described that require very few components to build a constant voltage flyback converter.

27 Claims, 10 Drawing Sheets

U.S. PATENT DOCUMENTS

| | | | |
|---|---|---|---|
| 7,259,972 B2 | 8/2007 | Yang | 363/21.16 |
| 7,295,449 B2 | 11/2007 | Berghegger | 363/19 |
| 7,352,595 B2 * | 4/2008 | Yang et al. | 363/21.13 |
| 7,362,592 B2 * | 4/2008 | Yang et al. | 363/21.13 |
| 7,362,593 B2 * | 4/2008 | Yang et al. | 363/21.16 |
| 7,486,528 B2 * | 2/2009 | Yang | 363/21.12 |
| 2005/0024898 A1 * | 2/2005 | Yang et al. | 363/21.12 |
| 2007/0121349 A1 | 5/2007 | Mednik et al. | 363/21.01 |

* cited by examiner

MAINTAINING A CONSTANT OUTPUT VOLTAGE BY SAMPLING AND HOLDING A VOLTAGE ACROSS AN AUXILIARY WINDING

CROSS REFERENCE TO RELATED APPLICATIONS

This application is a continuation of, and claims priority under 35 U.S.C. §120 from, nonprovisional U.S. patent application Ser. No. 12/001,173 entitled "Primary Side Constant Output Voltage Controller," filed on Dec. 10, 2007, which is now U.S. Pat. No. 7,635,956, the subject matter of which is incorporated herein by reference. Application Ser. No. 12/001,173, in turn, is a continuation of U.S. patent application Ser. No. 11/326,828 entitled "Primary Side Constant Output Voltage Controller," now U.S. Pat. No. 7,307,390, filed on Jan. 6, 2006, the subject matter of which is incorporated herein by reference.

TECHNICAL FIELD

The present invention relates generally to the field of power conversion, and more particularly to switching mode power supplies with regulated output voltage.

BACKGROUND

With the aggressive growth of battery-powered portable electronics, e.g., cell phones, the demand for lower cost, lighter weight and better efficiency battery chargers is very high. Historically, linear power supplies have been employed. However, despite being low in cost, linear power supplies cannot generally outperform switching mode power supplies, which have lower weight and much higher efficiency. For many applications, the flyback converter is often chosen from among different switching mode topologies to meet this demand due to its simplicity and good efficiency.

Over the years, various pulse width modulation (PWM) controller integrated circuit (IC) chips have been developed and used to build constant voltage flyback power supplies. Known designs require too many additional components to support the PWM controller IC chip, which increases cost and device size.

FIG. 1 (prior art) is a schematic diagram of an exemplary prior-art primary side controlled constant-output-voltage flyback converter circuit. Such a converter typically comprises a transformer 201 (which has three windings), a secondary side resistor 301 (which represents the copper loss of transformer 201), a primary switch 105, a secondary rectifier 302, an output capacitor 303, and a controller IC 104. A resistor 101 and a capacitor 102 provide the initial start-up energy for IC 104. Once the flyback converter is stable, IC 104 is powered by the auxiliary winding (with $N_a$ number of turns) of transformer 201 via rectifier 103. The output voltage is fed back to the primary side via the auxiliary winding, rectified and filtered by rectifier 107 and capacitor 110, and sensed by voltage divider resistors 108 and 109. A resistor 106 senses the current flowing through primary switch 105. IC 104 is a peak current mode PWM controller.

The circuit of FIG. 1 works well so long as the requirement of output voltage regulation is not stringent. Typically, 10% load regulation with a loading from 10% to 100% of its rated maximum load can be met. However, this regulation tends to become poor when loading drops below 10% of its rated load, both at least because the transformer copper loss varies with output current and input voltage and/or the auxiliary winding of transformer 201 contains an undesired resonant waveform when the flyback converter operates at discontinuous current mode (DCM).

In an attempt to meet this tight regulation requirement, the secondary side controlled flyback converter shown in FIG. 2 (prior art) is often used. Using this configuration, 5% or better load regulation with a loading from 10% to 100% of its rated maximum load can be typically achieved. In the circuit shown, the output voltage is sensed as an error signal by voltage divider resistors 305 and 307, and is monitored by a secondary IC 306. The error signal is then fed back to primary IC 104 via an optical coupler 202. A known disadvantage of this circuit, however, is its relatively high cost. For example, IC 306 and safety approved optical coupler 202 add significant cost, which can be up to 10% of the overall material cost in a typical application.

Some known approaches for primary feedback control of constant output voltage switching regulators teach the use of a reflected auxiliary winding voltage or current to control the peak voltage. One known deficiency of such known methods is that the constant control of the output voltage is applicable only in discontinuous conduction mode (DCM) operation, thereby limiting the power capability of the power converter. For continuous conduction mode (CCM) operation, current industry solutions almost exclusively rely on the use of an optocoupler as shown in FIG. 2. Typically, they will use the auxiliary current/voltage (e.g., via diode and RC filters) to control the peak primary voltage. When auxiliary voltage (i.e., the control voltage) decreases, the primary voltage is reduced. In addition, the output voltage variation versus load change and/or input voltage is often relatively poor. Thus, no tight regulation of input voltage is typically possible.

In view of the foregoing, what is needed is a relatively low-cost and effective control methodology of regulating the output voltage of a flyback converter. It would be desirable if at least some of the foregoing limitations of the prior art are overcome for both continuous voltage mode (CVM) and discontinuous mode (DCM) operation, preferably with a minimal number of IC chips (e.g., two IC chips). It is further desirable that the need for a secondary circuit and optical coupler are eliminated, and that the output voltage of a flyback converter be largely insensitive to temperature variations.

SUMMARY

To achieve the forgoing and other objects in accordance with the purpose of the invention, a variety of techniques to regulate the output voltage of a switching regulator are described.

Some embodiments of the present invention provide for a primary side, constant output voltage PWM controller system and/or IC for a switching regulator with a transformer having at least a primary, a secondary and an auxiliary winding that includes a timing generator configured to generate a sample timing signal based on a feedback signal, and is operable for controlling sampling in both a discontinuous current mode and a continuous current mode. The constant output voltage PWM controller system also includes two sample-and-hold circuits, one operable for sampling the feedback signal and the other operable for sampling the current of a switched power output device, both being configured with a control input that receives the sample timing signal and thereby controls the sampling. The PWM controller system also includes an error amplifier that outputs an error signal based on the difference between a reference signal and the sampled feedback signal, where the reference signal is used to set the output voltage level of the switching regulator. The PWM controller system also includes a comparator that is configured to compare one or more ramp signals such as, without limitation, the error signal and/or a slope compensation signal. The PWM controller system includes a PWM controller module that outputs a PWM switching regulator control signal based on an oscillator output and the comparator output and a gate drive module that receives the PWM control signal and generates a corresponding gate drive signal operable for properly turning on or off a switched power output device of the switching regulator.

A multiplicity of other embodiments may further provide variations of the prior embodiments in which the reference signal is provided by a programmable current mirror circuit operable to output a programmed current. In another embodiment, the sample-and-hold circuit for sampling the current of a switched power output device is removed. In another embodiment, the switched power output device is a power MOSFET that is configured as the main power switch of the switching regulator. In yet another embodiment, a current sensing circuit for generating the output current feedback signal optionally comprises a MOSFET connected in parallel with the switched power output device. In yet another embodiment, the comparator is a peak current mode PWM comparator with a slope-compensation input.

Another embodiment of the present invention provides means for achieving the functions described in the foregoing embodiments.

In yet other embodiments of the present invention, a constant output voltage PWM controller printed circuit board (PCB) module is described that includes a PCB and an embodiment of the foregoing integrated circuit device joined onto the PCB, where the PCB can be optionally populated with the necessary electronic components such that, in functional combination with the integrated circuit (IC) device, the PCB module is operable to perform as a constant voltage switching regulator.

A method, according to another embodiment of the present invention, is provided for regulating the output voltage of a flyback converter from the primary side. The method includes steps for regulating the output voltage of the flyback converter to a desired value and steps for reducing the temperature/copper loss sensitivity of the output voltage.

Other embodiments and advantages are described in the detailed description below, which should be read in conjunction with the accompanying drawings. This summary does not purport to define the invention. The invention is defined by the claims.

BRIEF DESCRIPTION OF THE DRAWINGS

The present invention is illustrated by way of example, and not by way of limitation, in the figures of the accompanying drawings and in which like reference numerals refer to similar elements and in which.

Unless otherwise indicated, illustrations in the figures are not necessarily drawn to scale.

DETAILED DESCRIPTION

Reference will now be made in detail to some embodiments of the invention, examples of which are illustrated in the accompanying drawings.

Although embodiments of the invention are discussed below with reference to the figures, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternatives embodiments do not necessarily imply that the two are mutually exclusive.

An aspect of the present invention is to provide a relatively low-cost and effective control methodology capable of regulating the output voltage of a flyback converter from the primary side with reasonably good accuracy from 0% to 100% of its rated load in at least some applications. In this way, the secondary side control circuit and the optical coupler may be eliminated, thereby reducing costs and improving reliability at least due to a lower component count.

As mentioned above, at least two factors can account for errors in the voltage regulation of a primary side controlled flyback converter circuit. Such factors include: 1) the transformer copper loss varies with output current and input voltage, and 2) the voltage sensing of the DCM operation is not accurate. To address the first factor, a current source that provides a current at a level derived from the primary switch current is used to compensate for the variations. To address the second factor, an adaptive sampling and hold circuit is used to capture the feedback voltage when the current of the secondary winding of the transformer discharges to zero. Based on this control methodology, two associated PWM controller IC chip embodiments will be described in some detail below.

Figure 1:
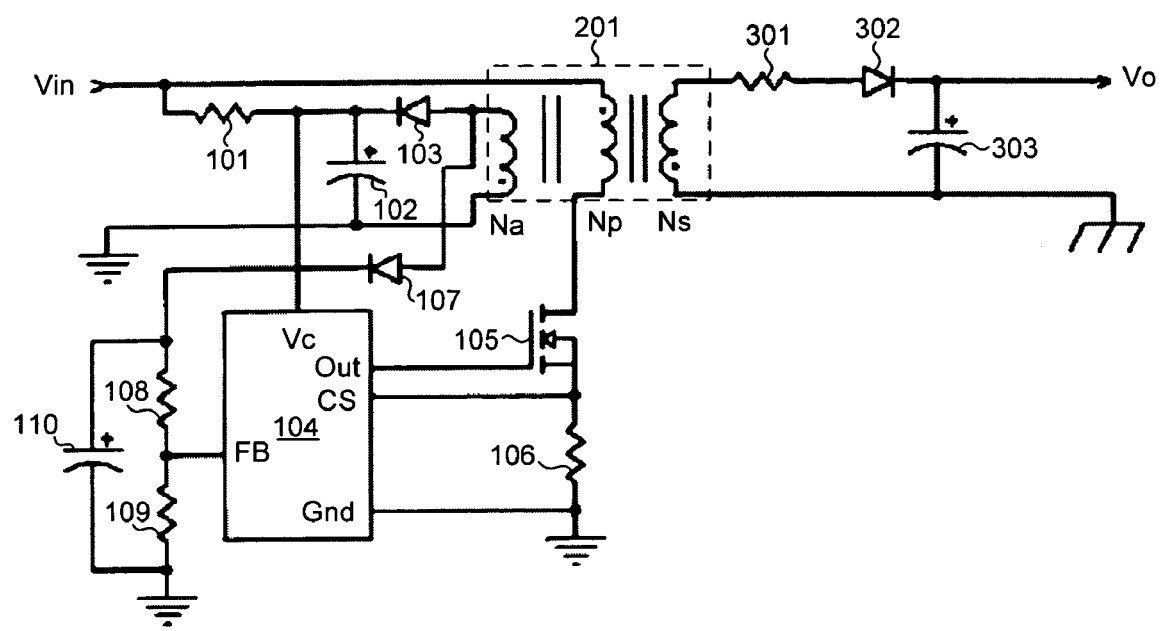
FIG. 1 (prior art) is a schematic diagram of an exemplary prior-art primary side controlled constant-output-voltage flyback converter circuit.
Figure 2:
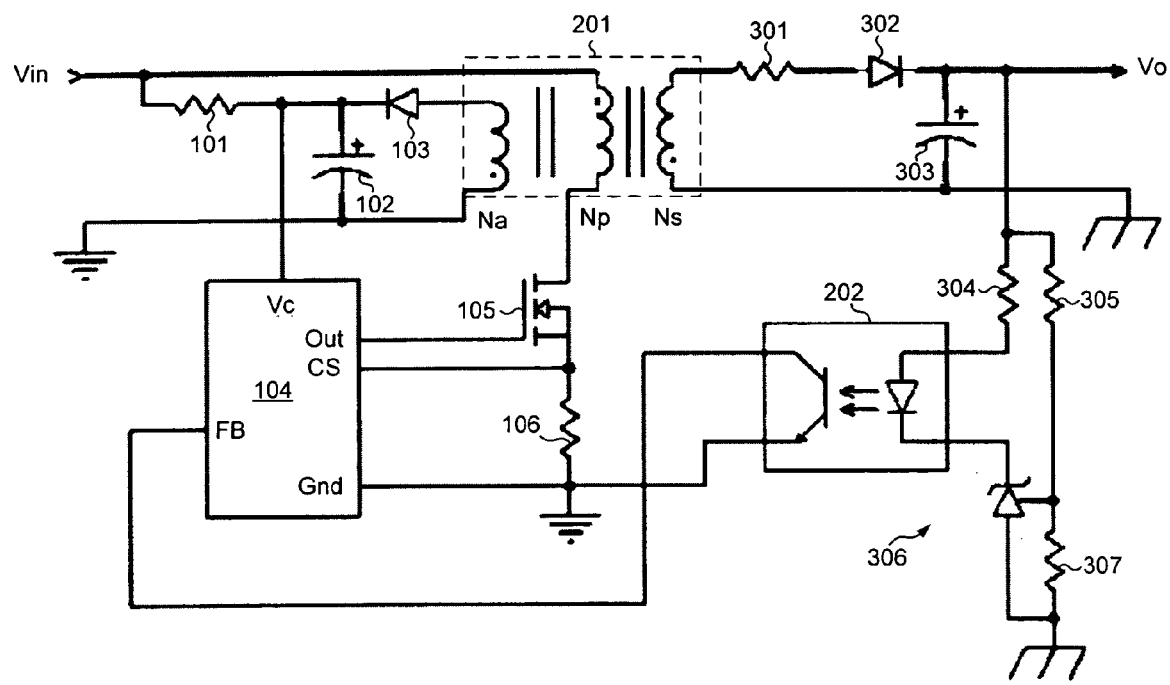
FIG. 2 (prior art) is a schematic diagram of an exemplary prior-art secondary side controlled constant-output-voltage flyback converter circuit.
Figure 3:
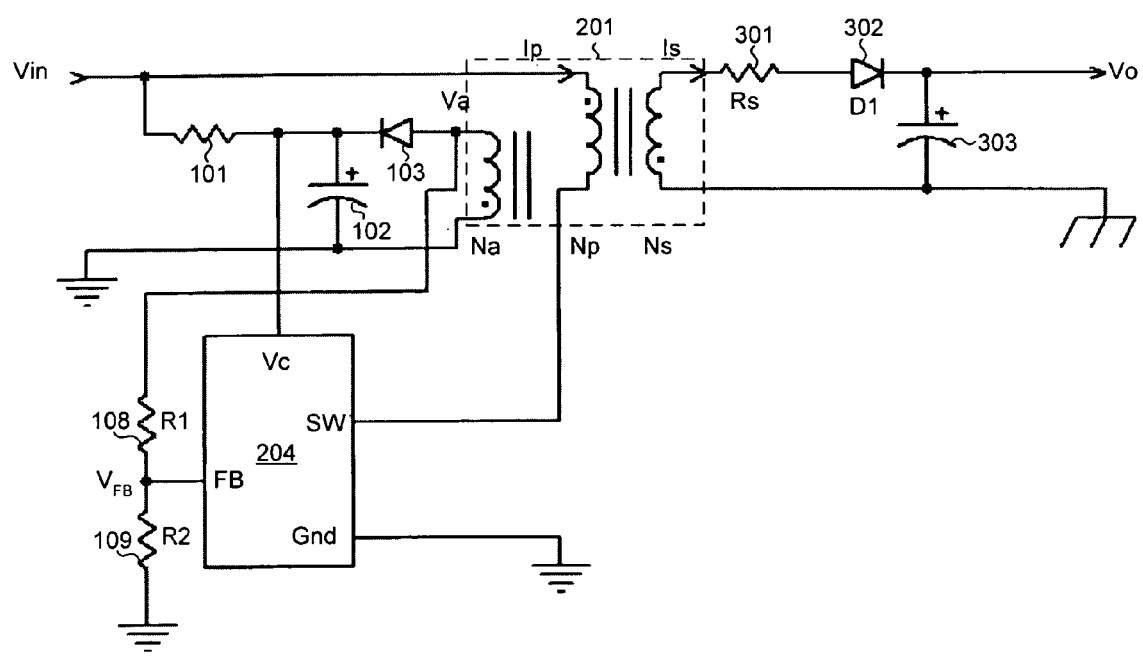
FIG. 3 illustrates, in accordance with an embodiment of the present invention, a schematic diagram of an exemplary primary side controlled constant-output-voltage flyback converter circuit implementing a first PWM controller IC chip embodiment of the present invention.

FIG. 3 shows, in accordance with an embodiment of the present invention, a schematic diagram of an exemplary primary side controlled constant-output-voltage flyback converter circuit implementing a first embodiment of PWM controller IC chip 204 in accordance with an aspect of the present invention. The exemplary circuit shown in FIG. 3 comprises a transformer 201 that has three windings (primary with $N_p$ turns, secondary with $N_s$ turns and auxiliary with $N_a$ turns), a secondary side resistor 301 (which represents the copper loss of transformer 201), a secondary rectifier 302, an output capacitor 303, and a peak current mode PWM control in PWM controller IC 204. Resistor 101 and capacitor 102 provide the initial start-up energy for PWM controller IC 204. Once the flyback converter is stable, PWM controller IC 204 is powered by the auxiliary winding of transformer 201 via rectifier 103. The output voltage is fed back to the FB input pin of PWM controller IC chip 204 via the auxiliary winding and voltage divider resistors 108 and 109. Those skilled in the art, in light of the teachings of the present invention, will readily recognize that the feedback for the FB input pin may come from any other suitable source beyond the auxiliary winding of the transformer, for example, from the primary winding. In alternate embodiments of the present invention (not shown), the transformer does not have any auxiliary windings and only has a primary and secondary winding. Those skilled in the art will recognize a multiplicity of alternate and suitable transformer types and interface circuit configurations to be operable with connection to the FB input pin.

PWM controller IC 204 is optionally capable of self-starting from the input line through a combination of a relatively large time constant charging resistor 101 and an energy storage capacitor 102.

Figure 4:
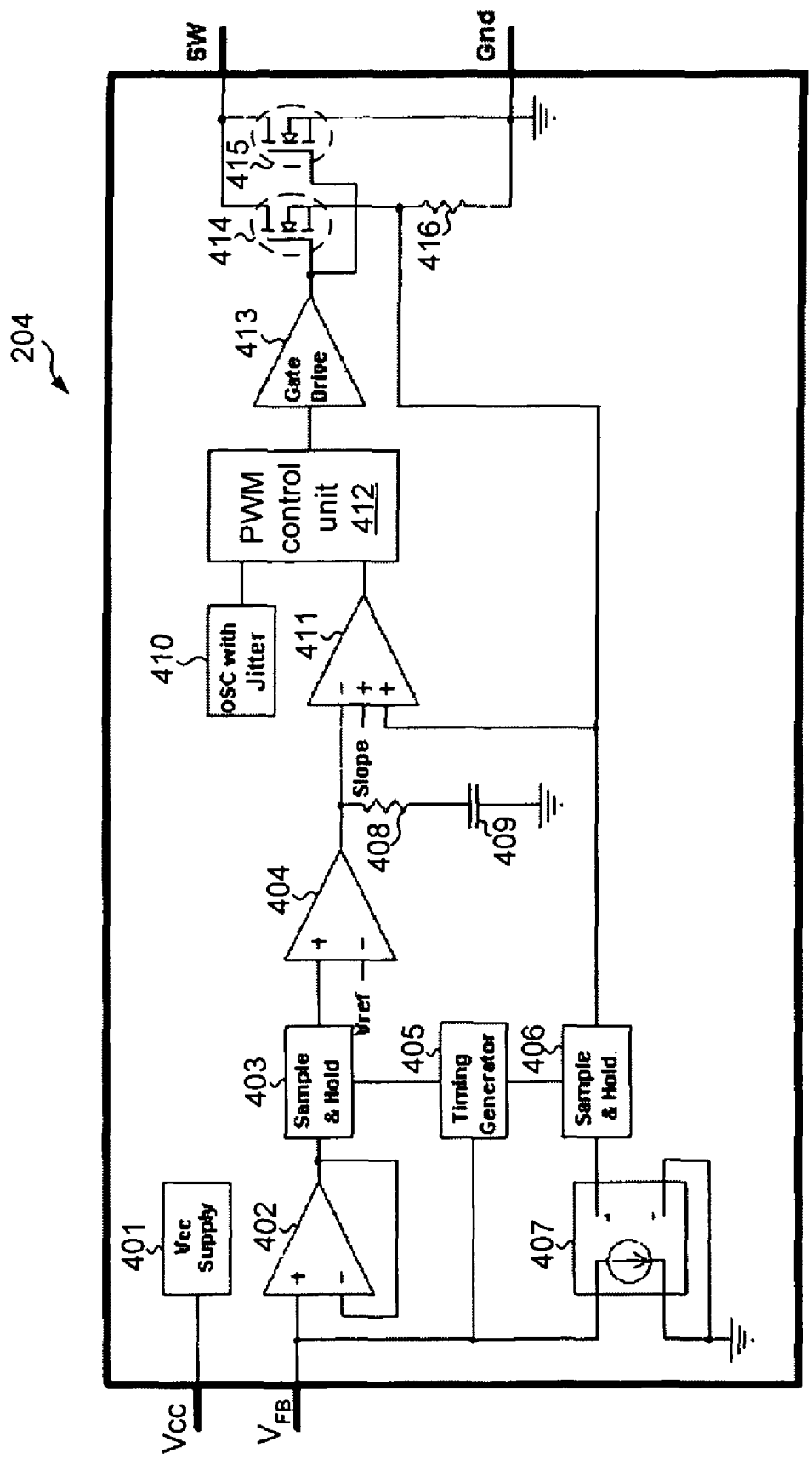
FIG. 4 is an exemplary block diagram of the first PWM controller IC chip embodiment.

FIG. 4 is an exemplary block diagram of a first embodiment of PWM controller IC chip 204. The first embodiment of PWM controller IC comprises an internal power MOSFET as the main switch and a current sense MOSFET. Hence, no external MOSFET or current sense resistor is needed for relatively low power applications. As illustrated in FIG. 4, a Vcc supply 401 provides an internal power supply and reference voltage. The feedback voltage $V_{FB}$ is amplified by a buffer 402 and then sampled and held by a sample-and-hold circuit 403. In the preferred embodiment of the present invention, the feedback voltage is sampled and held at the point that $V_{FB}$ has the minimum variation with respect to time. At this point, the output diode 302 generally has a minimum voltage and its temperature effect is typically the smallest. In applications that do not require such buffering, this buffer stage may be removed in alternate embodiments (not shown). An error amplifier 404 then compares the feedback voltage with a reference voltage ($V_{ref}$). A resistor 408 and a capacitor 409 form a compensation network for error amplifier 404. A comparator 411 serves as a peak current mode PWM comparator with a slope compensation input. In other embodiments of the present invention (not shown), the comparator may be configured by those skilled in the art to compare any suitable ramp signals depending upon the needs of the particular application.

A system oscillator 410 provides a frequency jittering function that widens the frequency spectrum and achieves a lower conducting EMI emission. The jittering function is preferably implemented as a digital jitter circuit that is configured to achieve more overall voltage regulation precision and is largely insensitive to temperature variations and other parasitic components. An example of a preferred frequency jittering circuit is described in connection with FIG. 10.

Alternate embodiments of the present invention may not include the frequency jittering function in system oscillator 410 and/or slope compensation. In many applications, slope compensation and the system oscillator jitter function can improve converter operation in certain input/output operating conditions. However, these functions are completely optional, whereby alternate embodiments of the present invention may not include either one or both.

A PWM control unit 412 then generates the correct PWM waveform by utilizing a cycle-by-cycle current limiting function. A MOSFET 413 is a high speed MOSFET gate driver. A power MOSFET 415 serves as the main switch, while a MOSFET 414 and a resistor 416 form a current sense circuit. As will be readily apparent to the system designer, some applications may not require resistor 416 to generate the current sensing voltage feedback or it may be located in other circuit configurations, or embedded into other system components. As will be readily recognized by those skilled in the art, depending upon the needs of the particular application and available technology, the power MOSFET may be formed in any suitable manner; by way of example, and not limitation, the power MOSFET may be comprised of a multiplicity of smaller MOSFET devices to form a single power MOSFET.

A timing generator 405 senses the negative going-edge of $V_{FB}$ waveform and produces triggering signals for sample-and-hold circuits 403 and 406.

A voltage controlled current source 407 then programs the current source to output a current having a level of $\beta \cdot I_p$ according to equation (2) described below, and is useful in many applications to make the feedback voltage largely independent of transformer copper loss. This is achieved by inserting a shunt current source (not shown in FIG. 3) at the mid-point of the feedback voltage divider resistors 108 and 109. The shunt current source is preferably programmed to provide a current proportional to the current of the primary switch (shown as current $I_p$ in FIG. 3). The calculation of the resistance of upper resistor 108 of the feedback voltage divider follows equation (5) below. Those skilled in the art will recognize a multiplicity of alternate and suitable means for achieving the same function as voltage controlled current source 407 instead of that shown. Sample-and-hold circuit 403 samples the buffered feedback voltage and sample-and-hold circuit 406 samples the current of the primary switch. In the present embodiment, the primary current $I_p$ flows through MOSFET 414 and power MOSFET 415, and the portion of $I_p$ flowing through MOSFET 414 is inversely proportional to the ON resistance of MOSFET 414 and power MOSFET 415. Resistor 416 produces a voltage that is also proportional to the primary current $I_p$. Sample-and-hold circuit 406 then senses the voltage across resistor 416, whereby the output voltage of the sample-and-hold circuit 406 controls the output current of voltage controlled current source 407. In this way, the combination of 406 and 407 work to carry out equation (2) below.

It should be appreciated that in contrast to conventional approaches that only work in DCM, the present embodiment implements a method for using "sampled auxiliary flyback voltage" to control the primary current. Sampling the auxiliary flyback voltage at a known time point provides a more accurate representation of the actual output voltage in most applications. The present embodiment is largely independent of auxiliary voltage and/or current variations by, for example, basing output current control based only on primary current sensing and the ratio of T_R/T_ON, which works in both DCM and CCM. Hence, embodiments of the present invention preferably do not use auxiliary voltage to control primary current by essentially scaling the peak current ($I_{PEAK}$) as proportional to the square root of the output voltage, as is done in conventional approaches.

Figure 5:
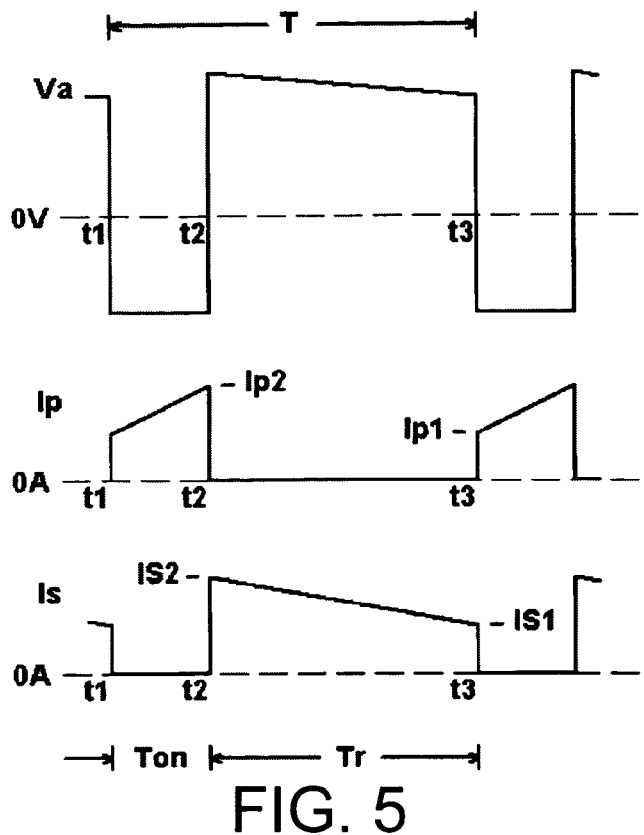
FIG. 5 illustrates exemplary ideal waveforms of the auxiliary winding voltage, primary switch current and secondary rectifier current of the flyback converter of FIG. 3 operating in continuous current mode (CCM)

FIG. 5 illustrates exemplary ideal waveforms of the auxiliary winding voltage, primary switch current and secondary rectifier current of the flyback converter of FIG. 3 operating in continuous current mode (CCM). With reference to both FIGS. 4 and 5, main switch 415 turns on at $t_1$, turns off at $t_2$ and turns on again at $t_3$. The switching period is T, the turn-on time is Ton and the turn-off time is $T_r$. The voltage at the auxiliary winding ($V_a$) at the time just before $t_3$ can be expressed as, $$V_a = (N_a/N_s) \cdot (V_o + V_{D1} + I_S \cdot R_S) \quad (1)$$

We may then assume that shunt current $I_{407}$ of current source 407, as shown in FIG. 4, is programmed by, $$I_{407} = \beta \cdot I_p \quad (2)$$

Because $$I_p = (N_S/N_p) \cdot I_s, \quad (3)$$

the output voltage sense $V_{FB}$ can be expressed by, $$V_{FB} = (R_2/(R_1+R_2)) \cdot (N_a/N_S) \cdot (V_o + V_{D1} + I_S \cdot R_S) - ((R_1 \cdot R_2)/(R_1+R_2)) \cdot \beta \cdot I_S \cdot (N_S/N_p), \quad (4)$$

where resistors 108 and 109 are referenced as $R_1$ and $R_2$, respectively.

If $R_1$ is chosen as, $$R_1 = (N_p \cdot N_a \cdot R_S)/(\beta \cdot N_S \cdot N_S) \quad (5)$$

then, $$V_{FB} = (R_2/(R_1+R_2)) \cdot (N_a/N_S) \cdot (V_o + V_{D1}). \quad (6)$$

Therefore, if the shunt current $I_{407}$ of voltage controlled current source 407 is programmed per equation (2) and the value of $R_1$ is chosen by equation (5), then output voltage sense $V_{FB}$ is practically independent of the copper loss ($I_S \cdot R_S$) of transformer 201. It should also be noted that, for CCM operation, $V_{FB}$ is preferably sampled and held at the time just before $t_3$, as it is optimal to sense the feedback voltage at the time just before the primary winding turns on for CCM and at the time when the current of the secondary winding of the transformer discharges to zero.

Figure 6:
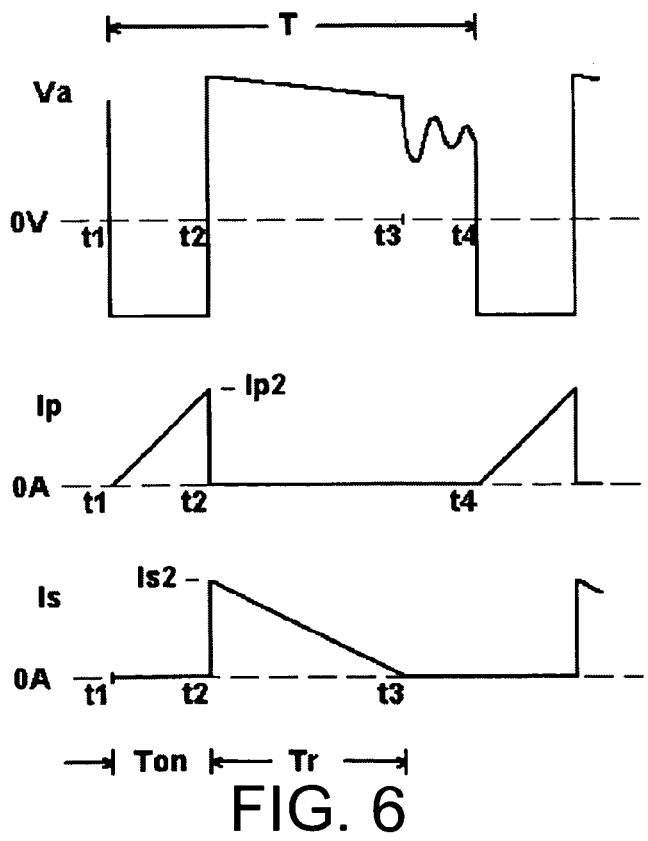
FIG. 6 illustrates exemplary ideal waveforms of the auxiliary winding voltage, primary switch current and secondary rectifier current of the flyback converter of FIG. 3 operating in discontinuous current mode (DCM)

FIG. 6 illustrates exemplary ideal waveforms of the auxiliary winding voltage, primary switch current and secondary rectifier current of the flyback converter of FIG. 3 operating in discontinuous current mode (DCM). With reference to both FIGS. 4 and 6, main switch 415 turns on at $t_1$, turns off at $t_2$ and turns on again at $t_4$. The switching period is T, the turn-on time is $T_{on}$ and the turn-off time is equal to ($t_4-t_2$). $T_r$ is equal to ($t_3-t_2$). As shown in FIG. 6, the current at the secondary winding of transformer 201 discharges to zero at $t_3$. The voltage $V_a$ at the auxiliary winding between times $t_3$ and $t_4$ oscillates at a frequency determined by the parasitic inductance and capacitance of the circuit. In this case, $V_{FB}$ is preferably sampled and held at the time just before $t_3$ to achieve a more accurate feedback voltage.

Figure 7:
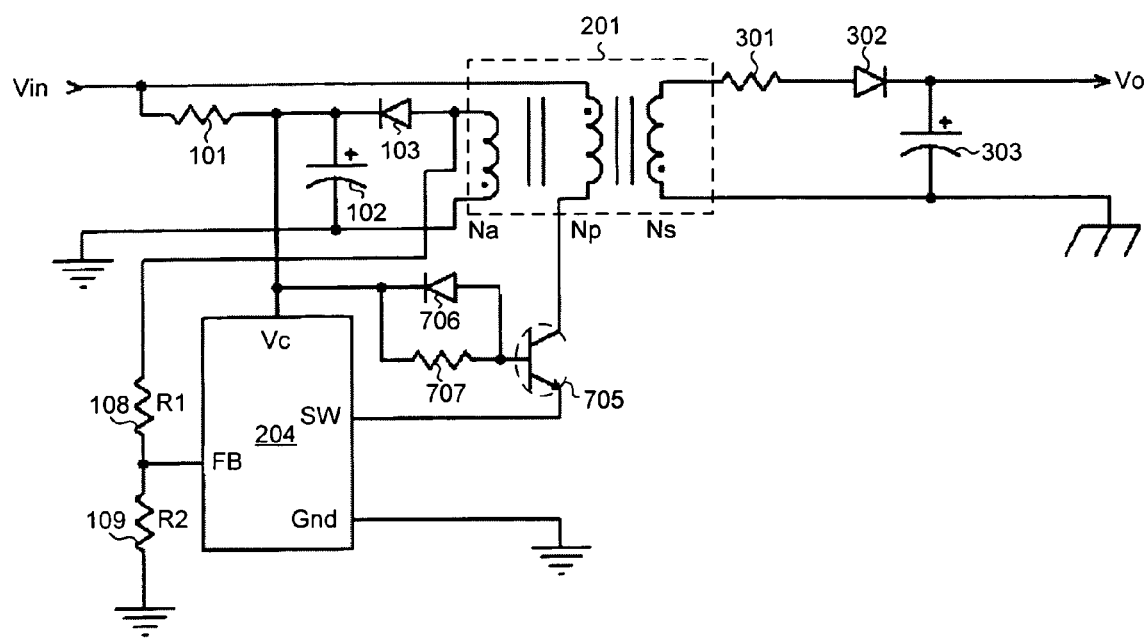
FIG. 7 is an exemplary schematic diagram of a primary side controlled constant output voltage flyback converter circuit implementing the first PWM controller IC chip embodiment in an emitter switching configuration according to an embodiment of the present invention.

FIG. 7 is an exemplary schematic diagram of a primary side controlled constant-output-voltage flyback converter circuit implementing the first embodiment of PWM controller IC chip 204 in an emitter switching configuration according to an embodiment of the present invention. As mentioned above, for low-power applications, no external power MOSFET or current sense circuit is needed. As shown in FIG. 7, the first embodiment of PWM controller IC chip 204 is configured to drive an NPN bipolar transistor in an emitter switching configuration to boost output power for higher power applications. In such a configuration, with reference to both FIGS. 4 and 7, internal MOSFET 415 drives the emitter of external NPN transistor 705, which serves as the main switch. To achieve further power handling capability and/or switching frequency, an external MOSFET must typically be used as the main switch as shown in FIG. 9.

Figure 8:
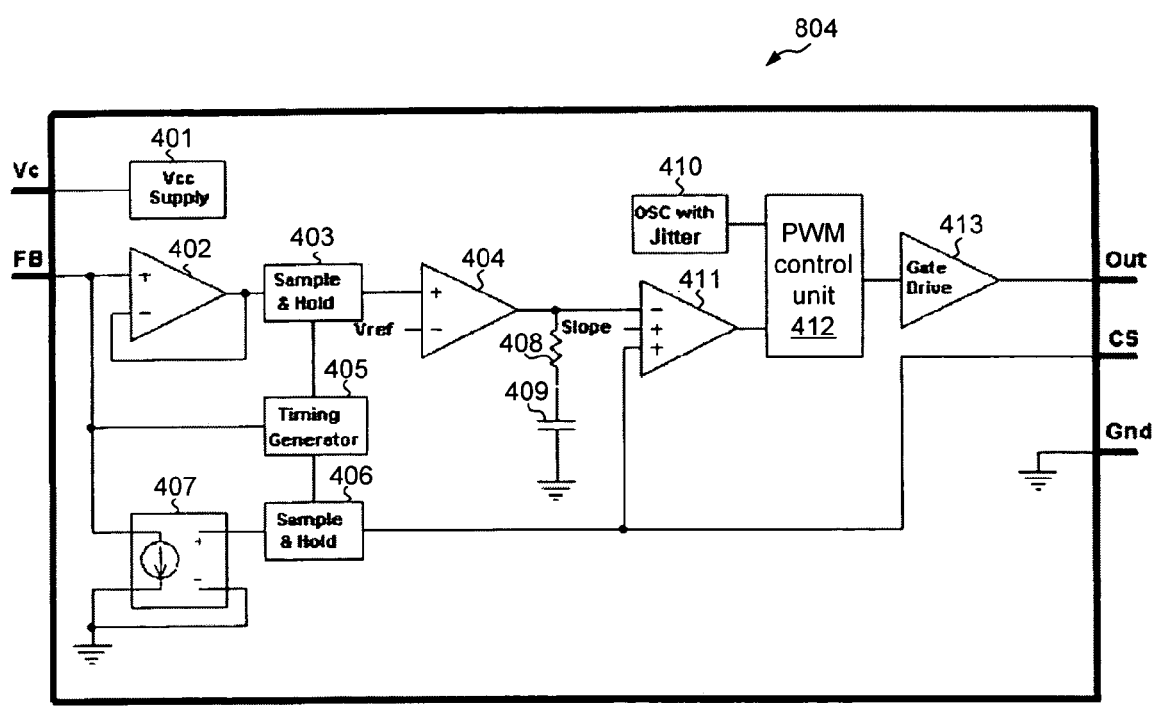
FIG. 8 is an exemplary block diagram of a second PWM controller IC chip embodiment of the present invention.

FIG. 8 illustrates an exemplary block diagram of a PWM controller IC chip 804, in accordance with a second embodiment of the present invention. PWM controller IC chip 804 does not include internal power MOSFET 415, current sensing MOSFET 414 and current sensing resistor 416 from the first PWM controller IC chip embodiment of FIG. 4. In this second embodiment, the current driving capability of gate drive 413 results in improved control for larger MOSFETs. In this second embodiment, gate drive 413 is designed with appropriate current driving capability suitable for controlling larger MOSFETs.

Figure 9:
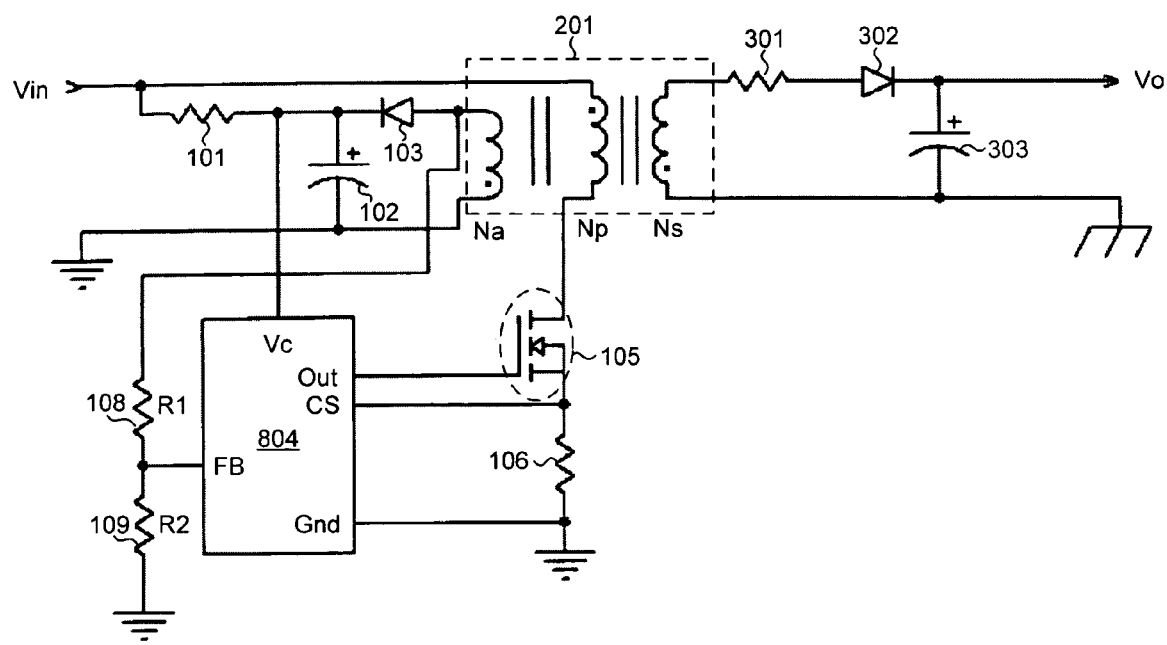
FIG. 9 is an exemplary schematic diagram of a primary side controlled constant output voltage flyback converter circuit implementing the second PWM controller IC chip embodiment with an external MOSFET and current sensing resistor, in accordance with an embodiment of the present invention.

FIG. 9 is an exemplary schematic diagram of a primary side controlled constant-output-voltage flyback converter circuit implementing PWM controller chip 804 with an external MOSFET and current sensing resistor, in accordance with an embodiment of the present invention.

Figure 10:
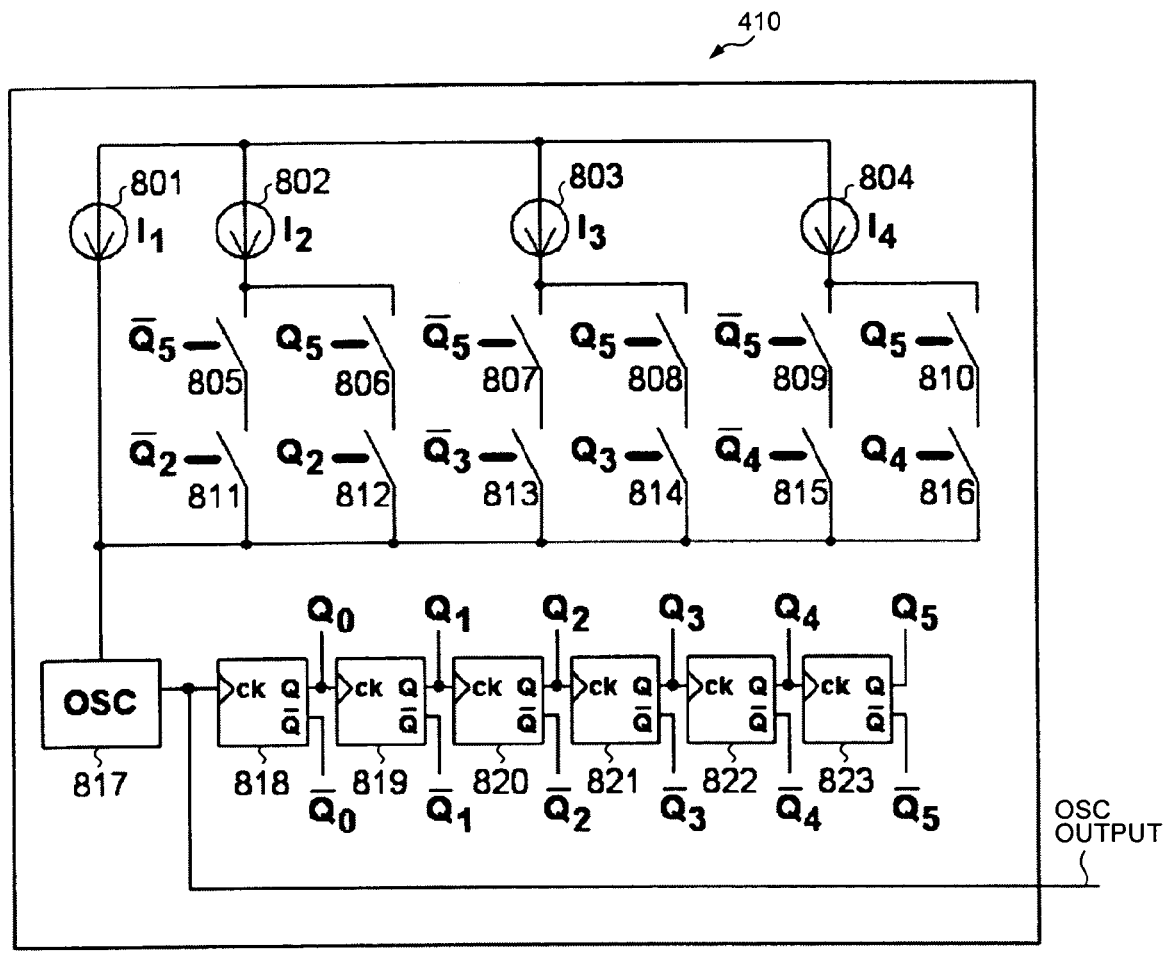
FIG. 10 is a schematic diagram of an exemplary digital frequency jittering circuit that is suitable to implement the foregoing jitter functional block, in accordance with an embodiment of the present invention.

The functional blocks shown in the prior embodiments may be implemented in accordance with known techniques as will be readily apparent to those skilled in the art. However, some embodiments of the present invention include implementation approaches that are not conventional. For example, without limitation, the foregoing jitter functional block may be implemented as follows. FIG. 10 illustrates a schematic diagram of an exemplary system oscillator 410 having a digital frequency jittering circuit that is suitable to implement the foregoing jitter functional block, in accordance with an embodiment of the present invention. The frequency jittering in the present embodiment is implemented by a digital control scheme, which departs from known approaches. An oscillator 817 is preferably a current controlled oscillator. There is preferably an uncontrolled, base-line, current source 801, which, in one aspect, is present to set a minimum oscillator frequency, $F_{min}$, that the switched current sources will jitter from. In the embodiment shown, the current to oscillator 817 is controlled by a multiplicity of switched current sources 802-804 that carry out the jittering of the oscillator's minimum frequency. The frequency of the system oscillator output signal is generally proportional to the total current entering into oscillator 817. In alternate embodiments, any number of current sources may be implemented depending upon the needs of the particular application. The jitter behavior is generated by feeding back a pseudo random digital signal to a multiplicity of series connected flip-flops (e.g., 818 to 823). Current sources 801, 802, 803 and 804 are presently preferred to be currents of magnitudes 100 µA, 2.5 µA, 5 µA and 10 µA, respectively. Each switched current source is presently configured with four current control switches (e.g., control switches 805, 806, 811 and 812 for switched current source 802) that are arranged in two parallel legs with each leg having two switches in series. In this way, for current to flow into oscillator 817 at least one leg must have both of its switches turned on. In similar fashion, four switches (807, 808, 813 and 814) are connected to switched current source 803 and another four switches (809, 810, 815 and 816) are connected to switched current source 804. All of these switches are closed or open by a control input from an output from the series connected flip-flop chain. In the example shown, the switch 805 is open when $Q_5$ is at logic level "1" and is closed when $Q_5$ is at logic level "0". Similarly, the switch 806 is open when $Q_5$ is at logic level "0" and is closed when $Q_5$ is at logic level "1", and so on. When all the switched current sources are enabled, a maximum frequency, $F_{max}$, of the system oscillator output signal is achieved. As will be readily apparent to those skilled in the art, in light of the present teachings, the choice of which flip-flop outputs connect to which current control switch will determine a certain jittering pattern. An aspect of this digital frequency jittering scheme is that the period and the step of frequency variation may be relatively precisely controlled, and is largely insensitive to temperature variations.

It should be appreciated that in contrast to conventional analog techniques for jittering the oscillator frequency, the digital jittering approach of the present embodiment always provides a digitally calculated frequency step irrespective of the known shortcomings that analog based techniques suffer from, such as temperature, input, output age dependences, etc. Those skilled in the art, in light of the present teachings, will readily recognize a multiplicity of alternate and suitable implementations that implement the spirit of the present embodiment. By way of example, and not limitation, current based operation may be replaced with a voltage based approach, and the number and topology of the switches and/or current sources and/or flip-flop chain may be altered as needed for the particular application, and other suitable means to selectively control the pattern of current flowing into the current controlled oscillator.

Figure 11:
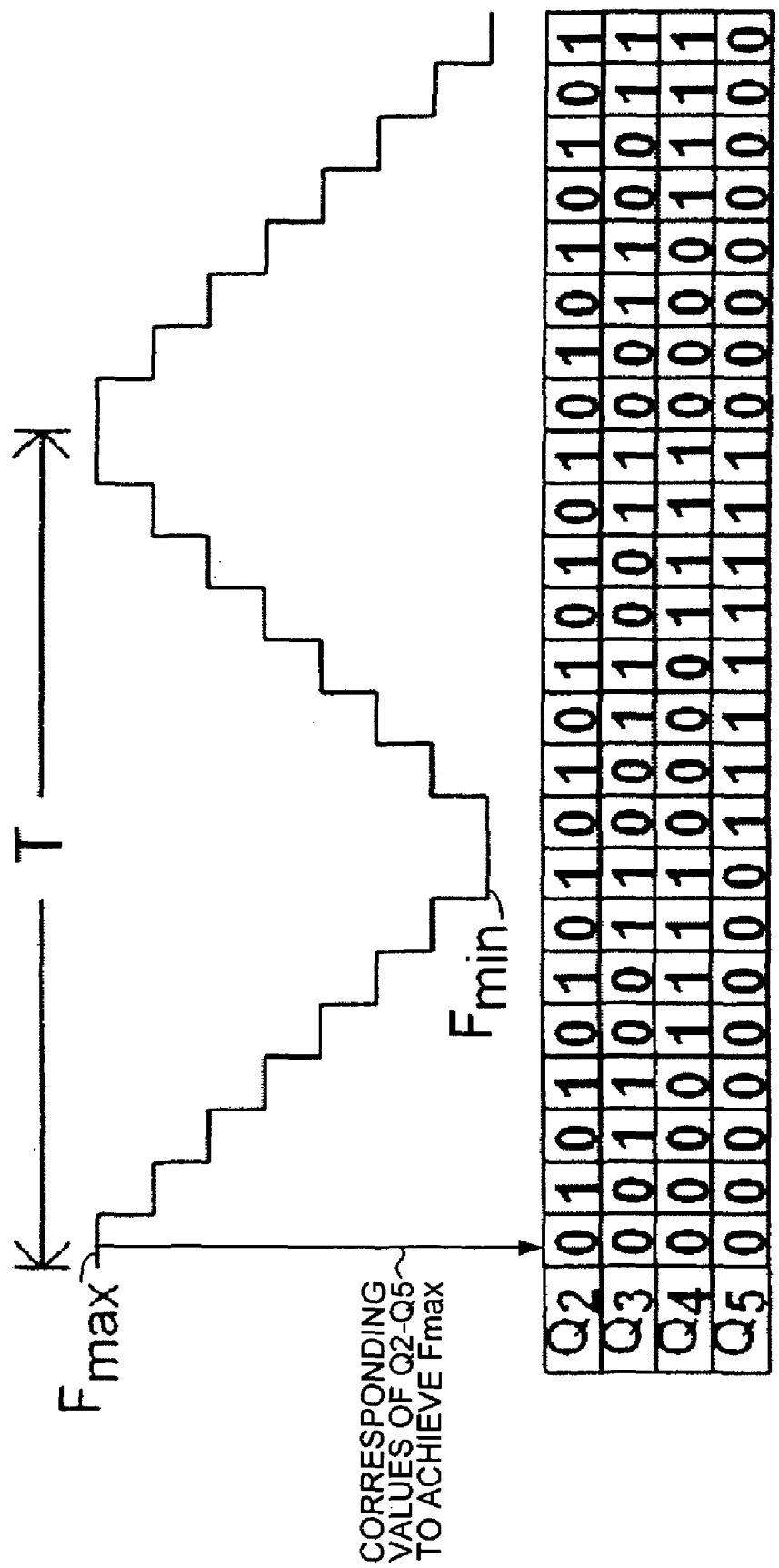
FIG. 11 illustrates an exemplary jitter frequency control logic diagram for the exemplary digital frequency jittering circuit of FIG. 10, in accordance with an embodiment of the present invention.

FIG. 11 illustrates an exemplary jitter frequency control logic diagram for the exemplary digital frequency jittering circuit of FIG. 10, in accordance with an embodiment of the present invention. In the example shown, frequency variation from its maximum ($F_{max}$) to minimum ($F_{min}$) corresponding to the logic states "0" or "1" of $Q_2$, $Q_3$, $Q_4$ and $Q_5$.

Having fully described at least one embodiment of the present invention, other equivalent or alternative techniques for a primary side constant output voltage controller according to the present invention will be apparent to those skilled in the art. The invention has been described above by way of illustration, and the specific embodiments disclosed are not intended to limit the invention to the particular forms disclosed. Accordingly, various modifications, adaptations, and combinations of various features of the described embodiments can be practiced without departing from the scope of the invention as set forth in the claims.

What is claimed is:

1. A controller integrated circuit, comprising:
    a timing generator that receives a feedback signal and generates a triggering signal based on the feedback signal;
    a first sample-and-hold circuit that receives the triggering signal, samples a voltage derived from the feedback signal and outputs a sampled feedback signal;
    an error amplifier that outputs an error signal based on the difference between a reference signal and the sampled feedback signal, wherein the reference signal sets an output voltage level of a switching regulator;
    a pulse-width-modulation controller that outputs a switching control signal based on the error signal;
    a gate drive module that receives the switching control signal and generates a gate drive signal; and
    a main switch, wherein the gate drive signal is used to turn on the main switch.

2. The controller integrated circuit of claim 1, wherein the first sample-and-hold circuit samples and holds the voltage derived from the feedback signal when the main switch is turned off and just before the main switch is turned on.

3. The controller integrated circuit of claim 1, further comprising:
    a current sense resistor; and
    a second sample-and-hold circuit that receives the triggering signal from the timing generator and determines a magnitude of current flowing through the main switch by sensing a voltage across the current sense resistor.

4. The controller integrated circuit of claim 1, wherein the timing generator generates the triggering signal by sensing a negative-going edge of the feedback signal.

5. The controller integrated circuit of claim 1, wherein the first sample-and-hold circuit samples a buffered voltage of the feedback signal.

6. The controller integrated circuit of claim 1, wherein the switching regulator has a primary winding, and wherein the main switch of the controller integrated circuit is connected directly to the primary winding.

7. The controller integrated circuit of claim 1, wherein the main switch of the controller integrated circuit is connected to an emitter of an external bipolar transistor of the switching regulator.

8. The controller integrated circuit of claim 1, wherein the main switch of the controller integrated circuit is connected to a field effect transistor of the switching regulator.

9. The controller integrated circuit of claim 1, wherein the feedback signal is derived from a transformer winding of the switching regulator that is electrically coupled to an input power source of the switching regulator.

10. The controller integrated circuit of claim 1, wherein the switching regulator has a primary winding, a secondary winding and an auxiliary winding, and wherein the feedback signal is derived from a voltage across the auxiliary winding.

11. The controller integrated circuit of claim 1, wherein the switching regulator does not include an optical coupler.

12. The controller integrated circuit of claim 1, further comprising:
    a current sense circuit that is coupled to the main switch and that outputs a current sense signal; and
    a comparator that receives the current sense signal and the error signal and that outputs a comparison signal, wherein the pulse-width-modulation controller receives the comparison signal.

13. An integrated circuit package, comprising:
    a switch terminal that is coupled to a main switch in a controller integrated circuit, wherein a gate drive module in the controller integrated circuit receives a switching control signal and generates a gate drive signal that turns on the main switch, wherein a pulse-width-modulation controller outputs the switching control signal based on an error signal, wherein an error amplifier outputs the error signal based on the difference between a reference signal and a sampled feedback signal, wherein the reference signal sets an output voltage level of a switching regulator;
    a feedback terminal that is coupled to a timing generator in the controller integrated circuit, wherein the feedback terminal receives a feedback signal, wherein the timing generator generates a triggering signal based on the feedback signal, and wherein a first sample-and-hold circuit receives the triggering signal, samples a voltage derived from the feedback signal and outputs the sampled feedback signal;

a power terminal through which power is provided to the controller integrated circuit; and a ground terminal through which the controller integrated circuit is grounded, wherein the integrated circuit package includes no terminals other than the switch terminal, the feedback terminal, the power terminal and the ground terminal.

14. The integrated circuit package of claim 13, wherein the first sample-and-hold circuit samples and holds the voltage derived from the feedback signal when the main switch is turned off and just before the main switch is turned on.

15. The integrated circuit package of claim 13, wherein the switching regulator comprises the integrated circuit package and an external bipolar transistor, and wherein the external bipolar transistor turns on in response to the main switch turning on.

16. The integrated circuit package of claim 15, wherein the main switch of the controller integrated circuit is coupled to an emitter of the external bipolar transistor.

17. The integrated circuit package of claim 15, wherein the controller integrated circuit includes a second sample-and-hold circuit that receives the triggering signal from the timing generator and samples a current flowing through the external bipolar transistor by sensing a voltage across a current sense resistor.

18. The integrated circuit package of claim 13, wherein the switching regulator has a primary winding, a secondary winding and an auxiliary winding, and wherein a voltage across the auxiliary winding is fed back to the feedback terminal via voltage divider resistors.

19. The integrated circuit package of claim 13, wherein the power terminal is coupled to a diode and to a resistor, wherein the switch terminal is coupled to an emitter of an external bipolar transistor, and wherein the diode and the resistor are coupled to a base of the external bipolar transistor.

20. A primary-side-controlled power converter, comprising:
a transformer that includes a primary winding, a secondary winding and an auxiliary winding, wherein the primary-side-controlled power converter is coupled to an input power source;
a main switch in a controller integrated circuit, wherein the main switch controls a current flowing through the primary winding; and
means for maintaining a constant output voltage of the primary-side-controlled switching power converter by sampling and holding a voltage derived from a voltage across the auxiliary winding that is electrically coupled to the input power source, wherein the means samples and holds the voltage lust before a current flowing through the secondary winding discharges to zero.

21. The primary-side-controlled power converter of claim 20, wherein the means includes an error amplifier that outputs an error signal based on the difference between a reference signal and the voltage that is sampled and held.

22. The primary-side-controlled power converter of claim 20, wherein the means includes a current source that provides current with a magnitude proportional to a current flowing through the auxiliary winding.

23. The primary-side-controlled power converter of claim 20, wherein the means includes a sample-and-hold circuit that determines a magnitude of a current flowing through the auxiliary winding by sensing a voltage across a current sense resistor in the controller integrated circuit.

24. The primary-side-controlled power converter of claim 20, wherein the primary-side-controlled power converter is configured as a flyback converter.

25. A primary-side-controlled power converter, comprising:
a transformer including a plurality of windings, wherein the primary-side-controlled power converter is coupled to an input power source;
a main switch in a controller integrated circuit, wherein the main switch controls a current flowing through one of the plurality of windings; and
means for maintaining a constant output voltage of the primary-side-controlled switching power converter by sampling and holding a voltage derived from a voltage across one of the plurality of windings that is electrically coupled to the input power source, wherein the means includes a timing generator that generates a triggering signal based on the voltage across one of the plurality of windings that is electrically coupled to the input power source.

26. A primary-side-controlled power converter, comprising:
a transformer including a plurality of windings, wherein the primary-side-controlled power converter is coupled to an input power source;
a main switch in a controller integrated circuit, wherein the main switch controls a current flowing through one of the plurality of windings; and
means for maintaining a constant output voltage of the primary-side-controlled switching power converter by sampling and holding a voltage derived from a voltage across one of the plurality of windings that is electrically coupled to the input power source, wherein the main switch is connected to an emitter of a bipolar transistor.

27. A primary-side-controlled power converter, comprising:
a transformer including a plurality of windings, wherein the primary-side-controlled power converter is coupled to an input power source;
a main switch in a controller integrated circuit, wherein the main switch controls a current flowing through one of the plurality of windings; and
means for maintaining a constant output voltage of the primary-side-controlled switching power converter by sampling and holding a voltage derived from a voltage across one of the plurality of windings that is electrically coupled to the input power source, wherein the main switch is connected to a field effect transistor.

* * * * *

UNITED STATES PATENT AND TRADEMARK OFFICE
CERTIFICATE OF CORRECTION

| | | |
|---|---|---|
| PATENT NO. | : 7,969,753 B2 | Page 1 of 1 |
| APPLICATION NO. | : 12/288927 | |
| DATED | : June 28, 2011 | |
| INVENTOR(S) | : Huynh et al. | |

It is certified that error appears in the above-identified patent and that said Letters Patent is hereby corrected as shown below:

Column 11, line 55, the word "lust" should be changed to --just--.

Signed and Sealed this
Sixteenth Day of August, 2011

David J. Kappos
*Director of the United States Patent and Trademark Office*